United States Patent
Thompson

(10) Patent No.: US 10,088,613 B1
(45) Date of Patent: Oct. 2, 2018

(54) PHOTOCHROMIC FILTER-BASED IMAGING SYSTEM

(71) Applicant: Weld Camera, LLC, Saugus, CA (US)

(72) Inventor: Gary J. Thompson, Saugus, CA (US)

(73) Assignee: Weld Camera, LLC, Saugus, CA (US)

( * ) Notice: Subject to any disclaimer, the term of this patent is extended or adjusted under 35 U.S.C. 154(b) by 85 days.

(21) Appl. No.: 15/091,534

(22) Filed: Apr. 5, 2016

Related U.S. Application Data

(60) Provisional application No. 62/178,244, filed on Apr. 6, 2015.

(51) Int. Cl.
| | |
|---|---|
| *G02B 5/23* | (2006.01) |
| *G06T 7/00* | (2017.01) |
| *H04N 5/235* | (2006.01) |
| *H04N 5/225* | (2006.01) |
| *G02B 5/20* | (2006.01) |

(52) U.S. Cl.
CPC ............. *G02B 5/23* (2013.01); *G02B 5/208* (2013.01); *G06T 7/0004* (2013.01); *H04N 5/2254* (2013.01); *H04N 5/2351* (2013.01); *H04N 5/2354* (2013.01)

(58) Field of Classification Search
None
See application file for complete search history.

(56) References Cited

U.S. PATENT DOCUMENTS

| | | | | |
|---|---|---|---|---|
| 5,255,088 A | * | 10/1993 | Thompson | H04N 7/18 219/121.23 |
| 5,475,198 A | | 12/1995 | Burke et al. | |
| 5,854,710 A | * | 12/1998 | Rao | G02B 5/23 359/559 |
| 2012/0235900 A1 | * | 9/2012 | Border | G02B 5/23 345/156 |
| 2014/0233105 A1 | * | 8/2014 | Schroeder | G01J 3/465 359/590 |
| 2015/0036204 A1 | * | 2/2015 | Branda | G02B 5/23 359/244 |
| 2017/0192257 A1 | * | 7/2017 | Branda | G02F 1/0102 |

\* cited by examiner

*Primary Examiner* — Reza Aghevli
(74) *Attorney, Agent, or Firm* — Loza & Loza, LLP; Stephen Burbach

(57) ABSTRACT

An imaging system for sensing light in an area of high optical contrast is disclosed. In some implementations, the imaging system is for monitoring a welding operation, whereby a photochromic filter is used to reduce the intensity of the light observed from the welding arc. The imaging system includes a light source whereby light from the light source activates the photochromic filter. Thus, the opacity of the photochromic filter depends on the intensity of the light from the light source.

19 Claims, 7 Drawing Sheets

PHOTOCHROMIC FILTER-BASED IMAGING SYSTEM

CLAIM OF PRIORITY

This application claims the benefit of and priority to provisional patent application No. 62/178,244 filed in the U.S. Patent and Trademark Office on Apr. 6, 2015, the disclosure of which is hereby incorporated by reference herein.

BACKGROUND

Field

This application relates generally to imaging systems and, more specifically but not exclusively, to monitoring an area of high optical contrast.

Introduction

Imaging systems can be used for remote monitoring of areas of high optical contrast. For example, U.S. Pat. No. 5,255,088 describes a system for monitoring a welding operation. Such a monitoring system may be used where it is impossible or impractical for a human operator to have direct, hands-on access to the workpiece such as when a weld must be produced in the inner diameter of a pipe or within a radioactive environment.

The monitoring system of U.S. Pat. No. 5,255,088 uses a photochromic filter to reduce the intensity of the light observed from a welding arc. Ultraviolet light from the welding arc activates the photochromic filter such that the photochromic filter filters incoming light, thereby reducing the dramatic contrasts in the light from the welding area as detected by the monitoring system.

The photochromic filter functions as a variable density optical filter because the opacity of the photochromic filter depends on the intensity of the ultraviolet light imparted on the photochromic filter. That is, the opacity of the photochromic filter increases if the intensity of the light from the welding arc increases, and vice versa. Consequently, such monitoring system is less effective for applications where the intensity of the ultraviolet light is lower. For example, the photochromic filter may be less effective in laser welding, plasma welding, and relatively low amperage arc welding applications (e.g., below 80 amperes).

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

The disclosure relates in some aspects to an imaging system for sensing light in an area of interest. Typically, the area of interest is an area of optical contrast (e.g., relatively high optical contrast). The imaging system uses a photochromic filter to reduce the intensity (e.g., brightness) of the light from the area of interest. The imaging system includes a light source whereby activating light (e.g., light in the range from ultraviolet light to short wavelength blue light) from the light source activates the photochromic filter. Thus, the opacity of the photochromic filter depends on the intensity of the light from the light source. In some implementations, the imaging system is used to monitor a welding operation. In this case, the photochromic filter functions as a variable density optical filter for viewing the area around a welding arc, where the opacity of the photochromic filter may be varied as a function of the intensity of the light from the light source.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

These and other aspects of the disclosure will be more fully understood when considered with respect to the following detailed description, the appended claims, and the accompanying drawings, wherein:

Figure 1:
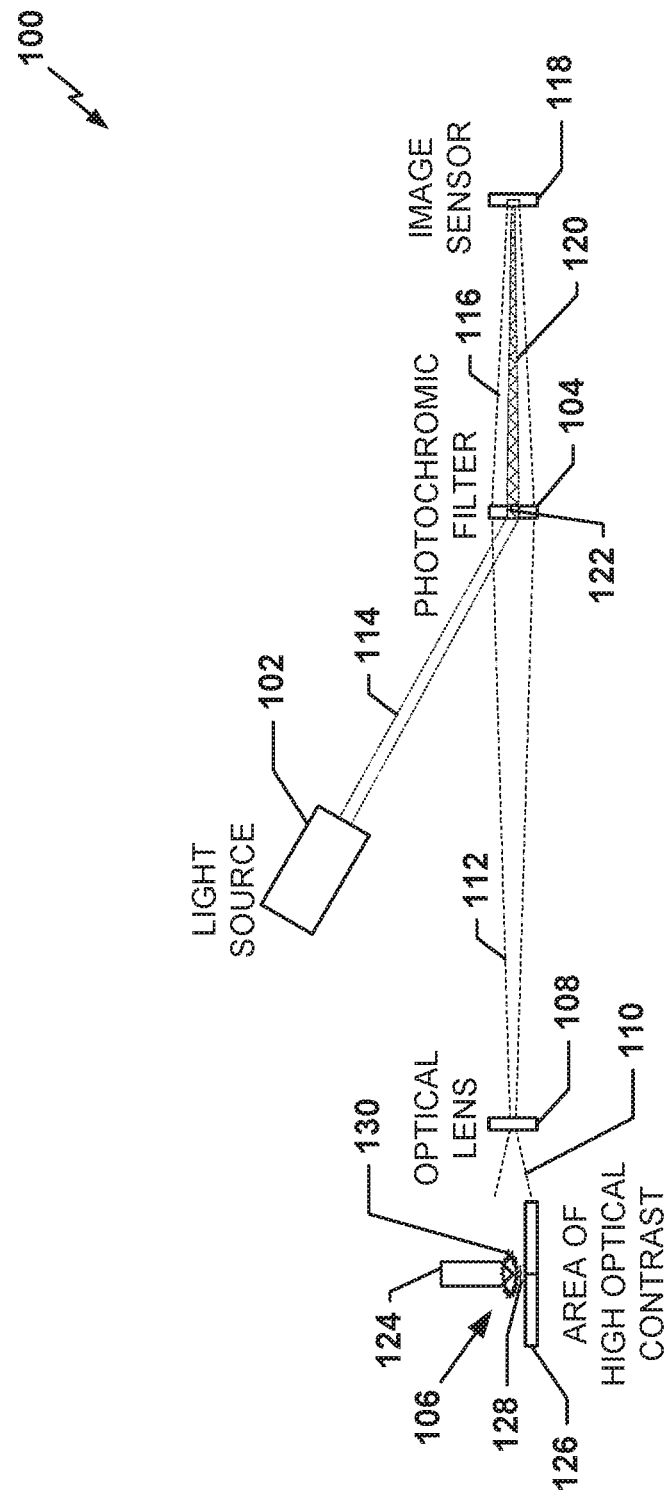
FIG. 1 is a block diagram illustrating an example of an imaging system in accordance with the teachings herein.

In accordance with common practice, the various features illustrated in the drawings are generally not drawn to scale. Accordingly, the dimensions of the various features may be arbitrarily expanded or reduced for clarity. In addition, some of the drawings may be simplified for clarity. Thus, the drawings typically do not depict all of the components of a given apparatus or method. Finally, like reference numerals may be used to denote like features throughout the specification and figures.

DETAILED DESCRIPTION

The description that follows sets forth one or more illustrative embodiments. It will be apparent that the teachings herein may be embodied in a wide variety of forms, some of which may appear to be quite different from those of the disclosed embodiments. Consequently, the specific structural and functional details disclosed herein are merely representative and do not limit the scope of the disclosure. For example, based on the teachings herein one skilled in the art should appreciate that the various structural and functional details disclosed herein may be incorporated in an embodiment independently of any other structural or functional details. Thus, an apparatus may be implemented or a method practiced using any number of the structural or functional details set forth in any disclosed embodiment(s). Also, an apparatus may be implemented or a method practiced using other structural or functional details in addition to or other than the structural or functional details set forth in any disclosed embodiment(s).

FIG. 1 illustrates an imaging system 100 that includes a light source 102 for activating a photochromic filter 104 (e.g., a photochromic lens filter) to filter out bright light from an area of high optical contrast 106. An optical lens 108 collects light 110 from the area of high optical contrast 106 and projects output light 112 onto the photochromic filter 104. The light source 102 projects light 114 onto an area of the photochromic filter 104. The photochromic filter 104 will thus attenuate some of the light 116 that is passed to an image sensor 118. The image detected by the image sensor 118 may then be displayed on a display device (not shown in FIG. 1).

By proper alignment of the optical lens 108 and the light source 102 with the area of high optical contrast 106 and the photochromic filter 104, particularly bright light emanating from the area of high optical contrast 106 can be attenuated by the photochromic filter 104. Thus, the portion 120 of the light 116 that passed through the activated portion 122 of the photochromic filter 104 will be attenuated. Consequently, large differences in optical contrast that are present in the light 110 from the area of high optical contrast 106 are reduced in the light 116 that ultimately reaches the image sensor 118.

For purposes of explanation, the relative sizes and placement shown for the components of FIG. 1 do not necessarily represent the sizes and placement that may be used in an actual implementation. For example, the photochromic filter 104 may be much closer to the image sensor 118. As another example, the optical lens 108 may be further away from the area of high optical contrast 106.

In a typical implementation, an area of optical contrast to be monitored by the imaging system 100 (e.g., the area of high optical contrast 106) corresponds to a welding area. For example, a welding electrode 124 may be used to weld together two workpieces 126, in the process creating a weld puddle 128 at the junction of the workpieces 126. The welding process generates an arc 130 of very high intensity, resulting in dramatic contrasts between the area of the arc 130 and the surrounding areas which would appear much darker. If a conventional image sensor is used to monitor these areas, the high intensity arc 130 tends to "wash out" bright portions of the sensed image, with the darker areas surrounding the arc 130 represented as being darkened to the point of obscurity.

This creates a problem because it is desirable for an operator to be able to view the welding process. For example, an operator would typically observe the position of the electrode 124 relative to the workpieces 126 along with the characteristics of the weld puddle 128 to ensure that the weld is produced uniformly and without flaws.

An imaging system constructed in accordance with the teachings herein can be used to address this problem in remote welding applications. The imaging system 100 is also effective for low amperage welding applications since the light source 102 controls the opacity of the photochromic filter 104. That is, the opacity of the photochromic filter 104 is not entirely dependent on the light from the welding arc 130.

The imaging system 100 can be configured to dynamically filter and reduce the steep intensity gradient areas to improve the monitoring of a welding process. Here, the photochromic filter 104 may serve as variable optical density filter to reduce the intensity of the desired areas and maintain the contrast in the remaining field of view. As one non-limiting example, the photochromic filter 104 may be constructed to absorb light having wavelengths in the range of 400 nanometers to 650 nanometers if the photochromic filter 104 is subjected to the activating light.

During the non-welding inspection process, the photochromic filter 104 can be deactivated (e.g., by turning off the light source 102) to diminish the filtering and provide a clear field of view. The photochromic filter 104 can be then be activated (e.g., by turning on the light source 102) before the plasma of the welding arc is present to create a smooth transition from non-welding to welding.

As discussed below, the light source 102 may include a light emitting diode (LED), a laser, or some other type of light source that emits electromagnetic radiation with the proper wavelengths and intensity for photochromic activation (e.g., violet light or ultraviolet light). As one non-limiting example, the light source 102 may generate light having wavelengths in the range of 350 nanometers (nm) to 420 nm. As another non-limiting example, the light source 102 may generate light having wavelengths in the range of 350 nm to 500 nm.

The intensity of the light output by light source 102 can be adjusted dynamically to alter the optical density of the light absorbing area(s) of the photochromic filter 104. For example, by increasing the intensity of the activating light, there may be a reduction in the high intensity areas of the welding process as detected by the image sensor 118. As one non-limiting example, the light source 102 may generate light having an intensity of 10 to 20 milliwatts (mW).

In some implementations, the light source 102 can be configured to project an image or sculpted light on the photochromic filter 104 to produce a light absorbing image. For example, the light source 102 may include or be used with an aperture structure that blocks some of the light from the light source 102, while allowing other light to pass. Thus, in some implementations, the light source 102 may include an aperture that is configured to restrict the light from the light source 102 to thereby project a light pattern on a surface of the photochromic filter 104.

Also, light from the light source 102 may be scanned on the photochromic filter 104 to produce light absorbing areas. For example, the light source 102 may be a laser that include the capability to selectively aim the output beam in different directions. Accordingly, in some implementations, the light source 102 includes a laser that is configured to scan a light pattern onto a surface of the photochromic filter 104.

If the photochromic filter 104 is in close proximity to the image sensor 118, a blocking filter (not shown in FIG. 1) can be employed to reflect or absorb the light from the light source 102 to prevent this light from impinging on the image sensor 118. Alternatively, or in addition, the output of the light source 102 can be controlled (e.g., timed with a shutter of the image sensor 118) to prevent the light from the light source 102 from being detected in the field of view of the image sensor 118.

Also, the orientation of the light source 102 relative to the photochromic filter 104 may serve to prevent activating light from the light source 102 from impinging on the image sensor 118. For example, a central axis associated with a light path (e.g., the light 114) from the light source 102 to the photochromic filter 104 may be oriented at an angle with respect to a central axis associated with a light path (e.g., the light 120) from the photochromic filter 104 to the image sensor 118. As illustrated in FIG. 1, the angle may be selected such that a majority of light projected by the light source 102 does not impinge upon the image sensor 118. As one non-limiting example, the angle may be greater than 20 degrees.

In some implementations, the photochromic filter 104 is positioned at an image plane in an optical relay system of the imaging system 100. For example, relay lenses (not shown) may be incorporated between the photochromic filter 104 and the image sensor 118.

In some implementations, the area of high optical contrast 106 is illuminated to improve the quality of the image shown on a display device. For example, the imaging system 100 could include one or more visible light sources (not shown) to illuminate the area of high optical contrast 106 (e.g., the welding area).

Figure 2:
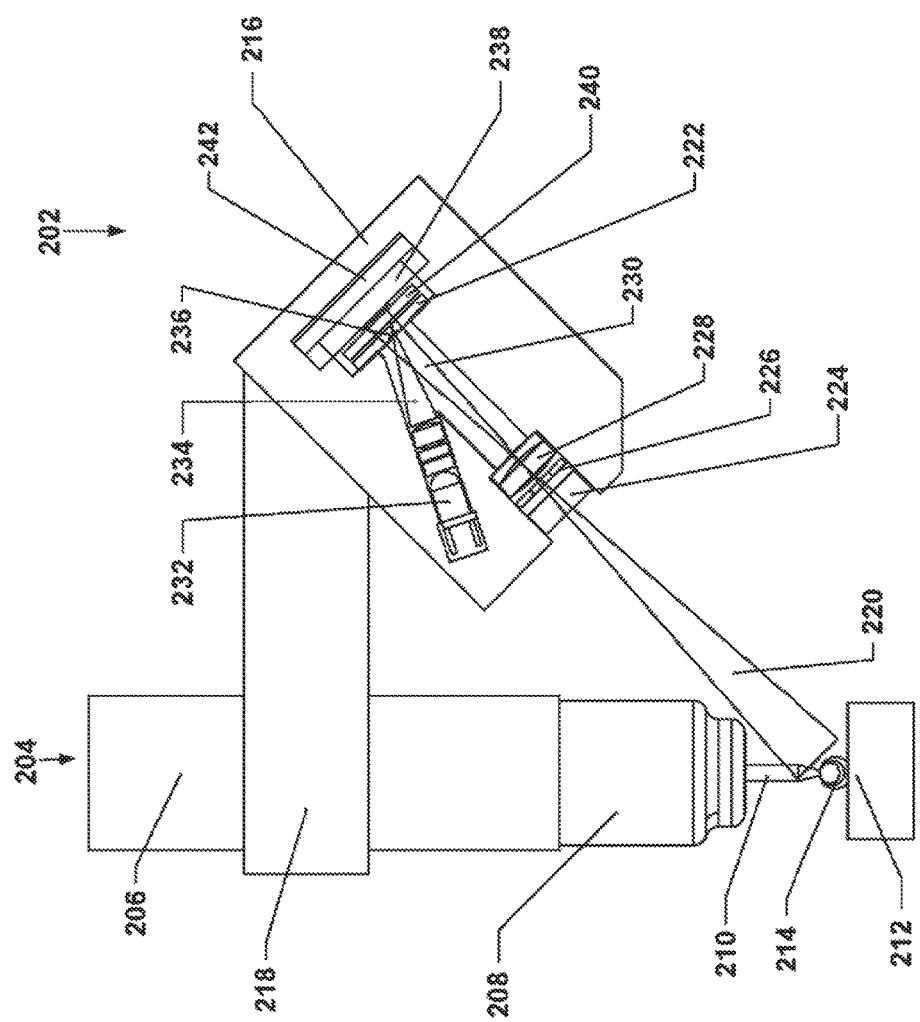
FIG. 2 is a cross-sectional schematic view of an example imaging system in accordance with the teachings herein.

With the above in mind, additional details of image monitoring in accordance with the teaching herein will be described with reference to FIG. 2. In FIG. 2, a camera 202 is attached to a welding device 204 to enable remote viewing of welding operations performed using the welding device 204.

The welding device 204 includes a welding torch body 206, an inert gas cup 208, and an electrode 210. During a welding operation on a weldment 212 (e.g., a workpiece), the electrode 210 generates a high intensity gradient arc 214.

The camera 202 includes a support structure 216 (e.g., a housing) that holds various lenses, filters, light source circuitry, and imaging circuitry. The support structure 216 is attached to the welding device 204 via an arm structure 218. That is, both the support structure 216 and the welding device 204 are attached to the arm structure 218. In some implementations, the arm structure 218 may allow relative movement (e.g., rotation, sliding, etc.) between the support structure 216 and the welding device 204.

The components of the camera 202 will now be discussed in more detail. It should be appreciated that the components depicted in FIG. 2 are but one example of components that could be incorporated into a camera (or other imaging system) in accordance with the teachings herein. Other implementations could exclude one or more of these components and/or could include one or more other components.

An objective lens assembly directs light from a field of view 220 of the camera 202 to a photochromic filter 222 (e.g., a photochromic lens filter). In this example, the objective lens assembly include a filter 224 for blocking infra-red light, an aperture structure 226 for restricting the field of view 220, and an objective lens 228. As indicated, the objective lens 228 focuses light 230 onto the photochromic filter 222. In this example, the aperture structure 226 is positioned adjacent the objective lens 228 and is configured to restrict the light directed to the photochromic filter 222. In other implementations, an objective lens may include an aperture.

Figure 3:
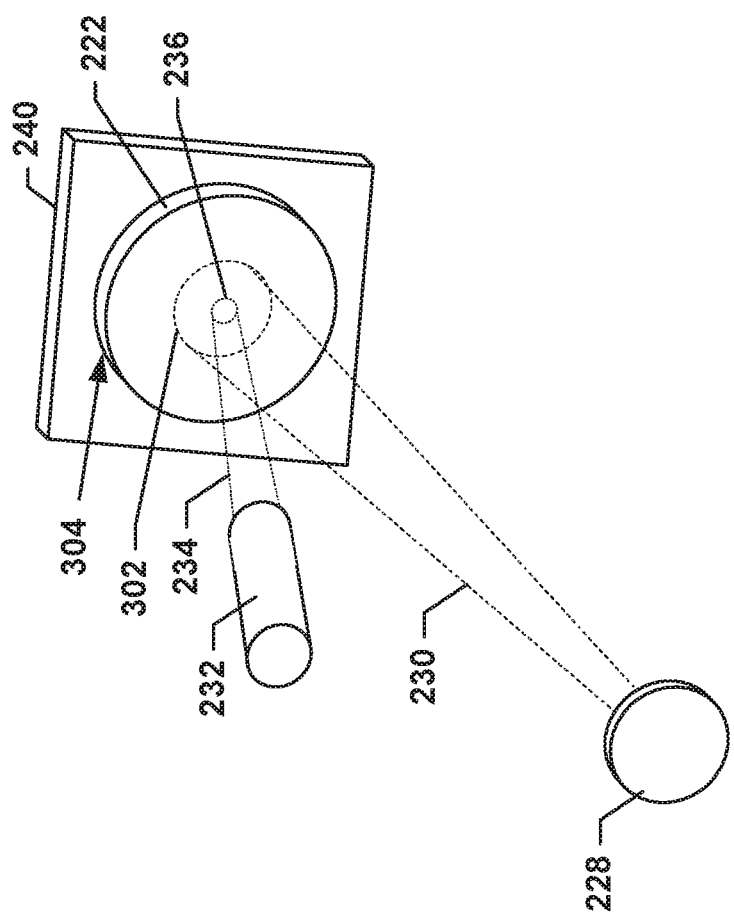
FIG. 3 is a perspective view illustrating an example of an image attenuating area in accordance with the teachings herein.

A light source 232 projects activating light 234 onto an area 236 of the photochromic filter 222, thereby activating (darkening) the area 236. The projections of the light 230 and the light 234 are illustrated in more detail in FIG. 3. As shown in FIG. 3, the light 230 projects onto an area 302 of the photochromic filter 222, while the light 234 projects onto the area 236 of the photochromic filter 222. The area 236 lies entirely within the area 302 in this example (although that need not be the case). As discussed above, by positioning the components of the camera 202 properly, the area 236 (image attenuating area) of the photochromic filter 222 may be aligned with the portion of the inbound light 230 that is of particularly high intensity (e.g., focused light from the arc 214). Accordingly, the area 236 will attenuate this high intensity light as it passes through the polychromic filter 222. As a result, the light that ultimately reaches an image plane 304 of the image sensor 238 will have less dramatic optical contrast as compared to the light emanating from the welding area.

Referring again to FIG. 2, the camera 202 includes a filter 240 between the photochromic filter 222 and the image sensor 238. The filter 240 may, for example, prevent ultraviolet light or other undesirable light wavelengths (e.g., projected from the light source 232) from impinging upon the image sensor 238. As one non-limiting example, the filter 240 may be constructed to block (e.g., absorb and/or reflect) light having wavelengths in the range of 250 nm to 420 nm. As another non-limiting example, the filter 240 may be constructed to block (e.g., absorb and/or reflect) light having wavelengths in the range of 350 nm to 420 nm.

FIG. 2 also illustrates that the image sensor may be connected to (e.g., attached to) a printed circuit board 242 (PCB). The PCB 242 includes signal traces (and, optionally, electronic circuitry) that enables signal to be sent between the image sensor 238 and signal processing components (not shown in FIG. 2).

Each of the components of the camera 202 is attached to the support structure 216 in some manner. An attachment may be direct or indirect (e.g., via another component). In some cases, an attachment is a fixed attachment. Here, there is no relative movement between the component and the support structure 216. In some cases, an attachment is a movable attachment. Here, the attachment allows some relative movement between the component and the support structure 216 (e.g., sliding, rotating, etc.). In some implementations, the attachment may allow relative movement between two or more components. For example, an operator may be able to move the lenses of the camera 202 towards or away from one another to focus the camera 202 on an area of interest.

Figure 4:
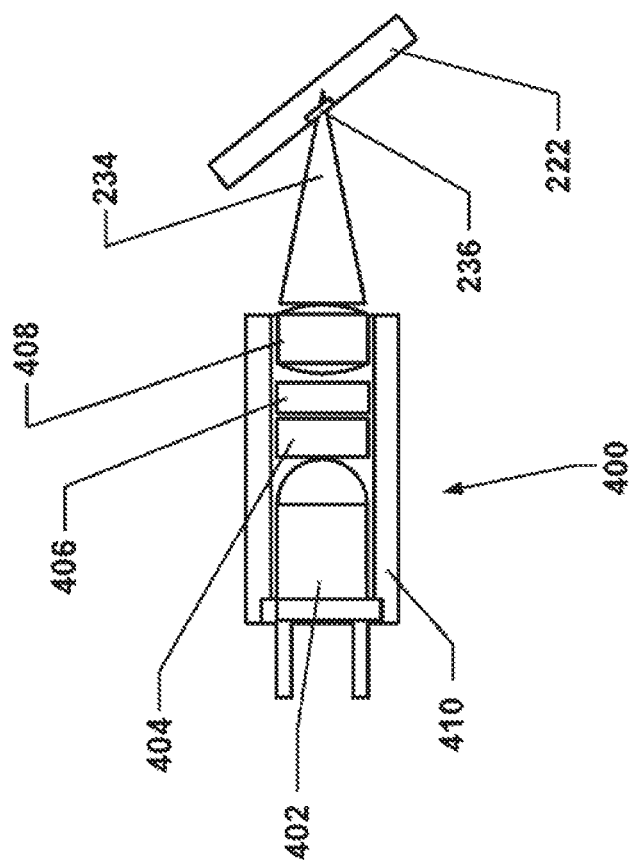
FIG. 4 is a cross-sectional schematic view of an example of an LED-based light source in accordance with the teachings herein.
Figure 5:
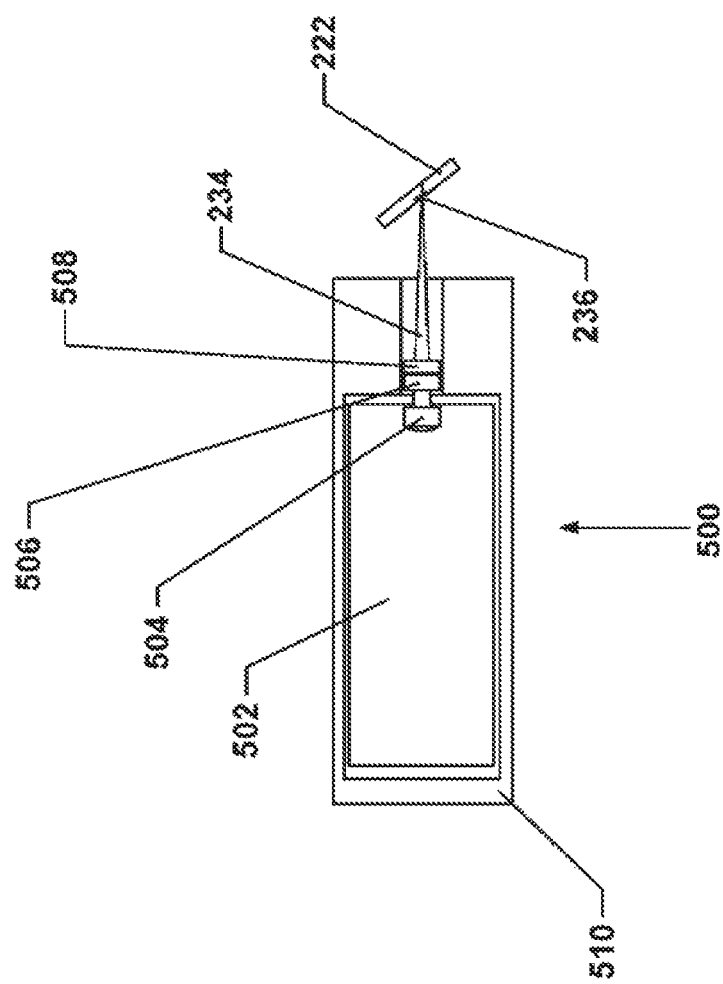
FIG. 5 is a cross-sectional schematic view of an example of a laser-based light source in accordance with the teachings herein.

As mentioned above, a light source may take different forms in different implementations. FIGS. 4 and 5 illustrates two example of light sources.

FIG. 4 illustrates a light source 400 that includes an LED 402 for generating photochromic activating light. The light source 400 includes a short wave pass filter 404 for passing a specified range of light having relatively shorter wavelengths (e.g., less than 420 nm) and a long wave blocking filter 406 for blocking a specified range of light having relatively longer wavelengths (e.g., greater than 420 nm). The light source 400 also includes a lens 408 for focusing the light 234 generated by the light source 400 onto the area 236 (activated area) of the photochromic filter 222. Finally, the light source 400 includes a housing 410 for holding the above components of the light source 400 in place.

FIG. 5 illustrates a light source 500 that includes a laser 502 for generating photochromic activating light. As one non-limiting example, the laser 502 may be constructed to generate light having a nominal wavelength of 405 nm. The laser 502 includes an aspherical lens 504 for focusing the light output by the laser 502. The light source 500 includes a short wave pass filter 506 for passing a specified range of light having relatively shorter wavelengths (e.g., less than 420 nm) and a long wave blocking filter 508 for blocking a specified range of light having relatively longer wavelengths (e.g., greater than 420 nm). Finally, the light source 500 includes a housing 510 for holding the above components of the light source 500 in place.

Figure 6:
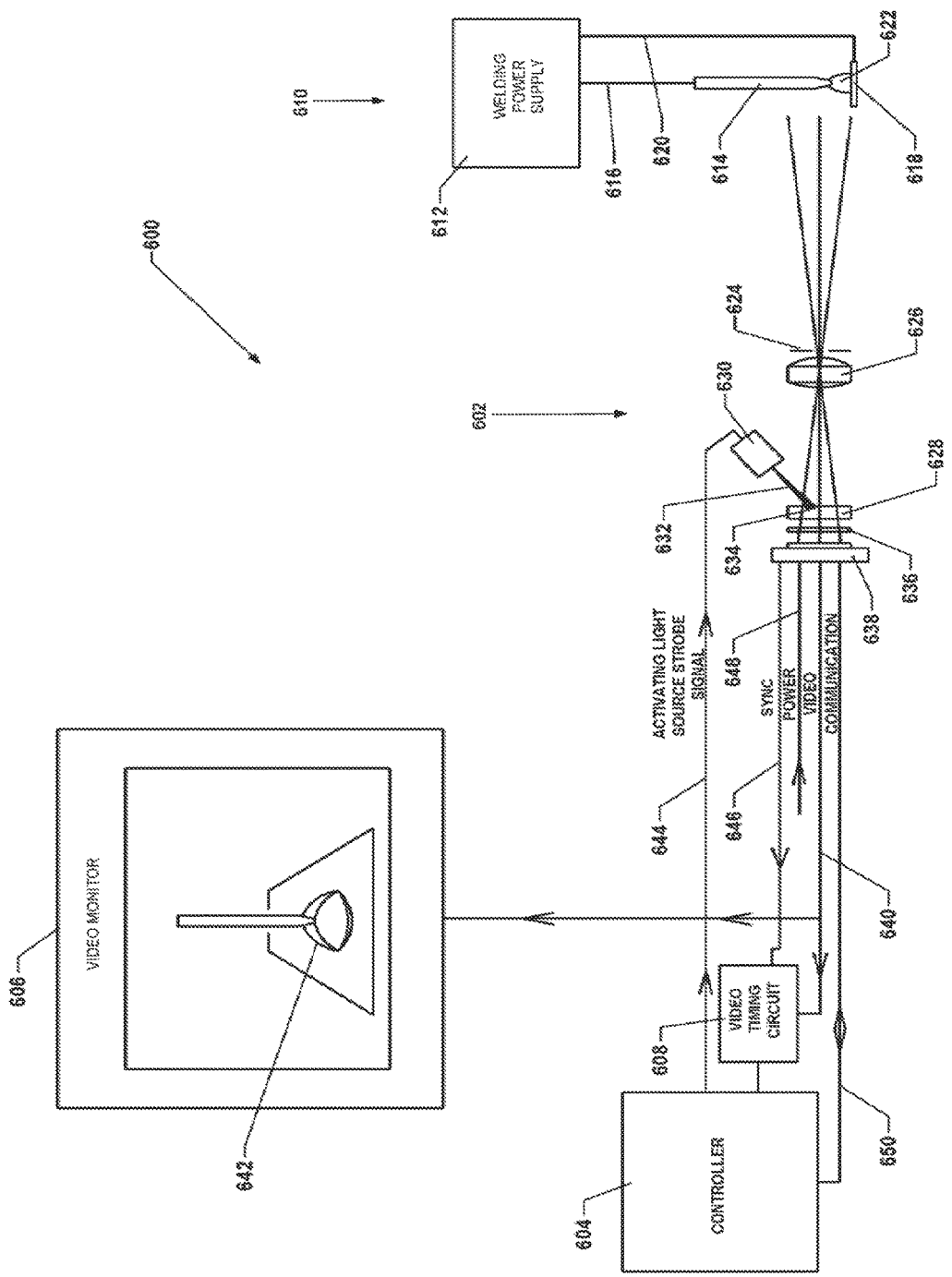
FIG. 6 is a block diagram illustrating an example of an imaging system in accordance with the teachings herein.

FIG. 6 illustrates several examples of circuitry that may be incorporated into an imaging system 600 as taught herein. The imaging system 600 includes optical components 602, a controller 604 (e.g., a micro controller), a video monitor 606, and an optional video timing circuit 608.

The imaging system 600 monitors a welding operation performed by a welding device 610 as discussed herein. The welding device 610 include a power supply 612 that is electrically coupled to a welding electrode 614 via an electrode cable 616 and to a weldment 618 via a ground cable 620. During the welding operation, the welding device 608 generates an arc 622, resulting in an area of high optical contrast.

The optical components 602 include an aperture structure 624 for restricting the field of view of the imaging system 600 as discussed herein, and an objective lens 626 for focusing light from the welding area to a photochromic filter 628. A photochromic activating light source 630 generates light 632 that increases the optical density of a portion 634 of the photochromic filter 628. A blocking filter 636 prevents activating light that may pass through the photochromic filter 628 from reaching an image sensor 638.

Video signals 640 generated by the image sensor 638 are sent to the video monitor 606. The video monitor 606 then displays a representation of the welding area based on the video signals 640. In particular, the displayed image includes an attenuated representation 642 of the area of high intensity light due to the arc 622, thereby enabling more effective viewing of the area surrounding the arc 622.

As mentioned above, the light source 630 may be controlled to improve the imaging capabilities of the imaging system 600. To this end, the controller 604 may generate a strobe signal 644 that controls when the activating light source 630 is enabled or disabled. Alternatively, or in addition, the video timing circuit 608 may receive synchronization signals 646 (sync) and the video signals 640 from the image sensor 638. Based on these signals, the video timing circuit 608 may cooperate with the controller 604 to control when the light source 630 is enabled or disabled. For example, the controller 604 may synchronize activation of the light source 630 with activation of the image sensor 638. As a more specific example, the controller 604 may deactivate the light source 630 a defined period of time prior to activation of the image sensor 638. Thus, the light source 630 is turned off when the image sensor 638 is sensing to prevent light from the light source 630 from adversely affecting the sensing operation of the image sensor 638. Here, it should be appreciated that the photochromic filter 628 may remain activated for a period of time (e.g., several seconds) after the light source 630 is turned off. Thus, the light detected by the image sensor 638 may still be attenuated (as discussed above) for a period of time when the light source 630 is off.

FIG. 6 also illustrates other signals that may be provided to or by the image sensor 638. For example, power 648 may be selectively supplied to the image sensor 638 (e.g., under the control of the controller 604).

In addition, the controller 604 and the image sensor 638 may exchange communication signals 650 to control the operation of the image sensor 638. For example, the controller 604 may be configured to receive a signal (e.g., from an input device used by an operator) corresponding to a desired opacity of the photochromic filter 628, and then control the intensity of the light 632 projected by the light source 630 (e.g., by controlling the strobe signal 644 or some other suitable signal sent to the light source 630) based on the received signal. In some implementations, the desired opacity (e.g., in the center of the photochromic filter) is up to 80%. In some implementations, the controller 604 may be configured to specify a duty cycle for the light 632 projected by the light source 630 to control the intensity of this light.

Figure 7:
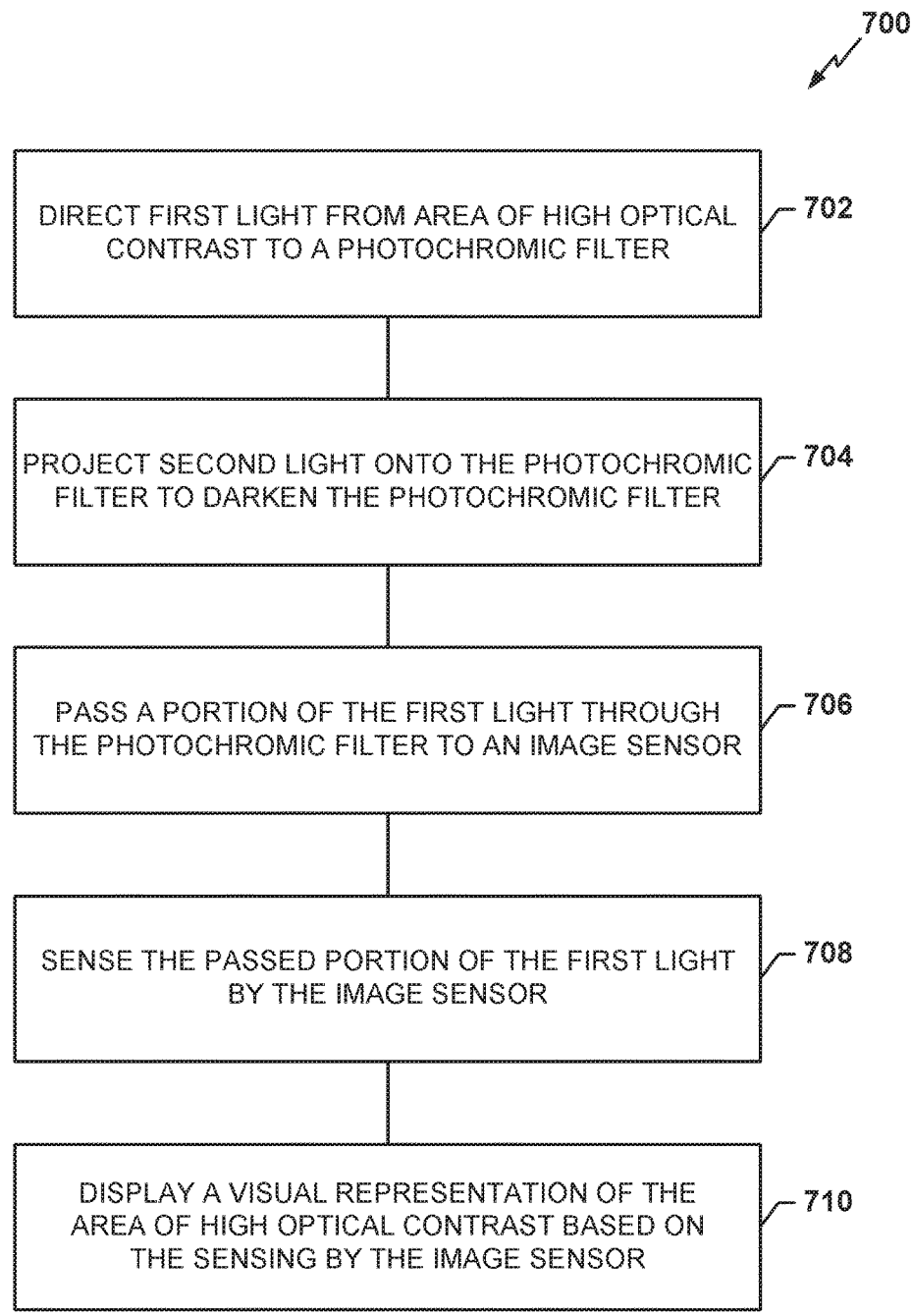
FIG. 7 is a flow diagram illustrating an example of an imaging process in accordance with the teachings herein.

FIG. 7 illustrates an example of a process 700 for viewing an area of high optical contrast in accordance with some aspects of the disclosure. The process 700 may take place, at least in part, through the use of an imaging system, a camera system, or some other suitable apparatus. Of course, in various aspects within the scope of the disclosure, the process 700 may be implemented using any suitable apparatus capable of supporting imaging-related operations.

At block 702, first light is directed from an area of high optical contrast to a photochromic filter. This operation may correspond to, for example, the optical lens 108 of FIG. 1 receiving the light 110 and focusing this light (corresponding to the light 112) onto the photochromic filter 104.

At block 704, second light is projected onto the photochromic filter to darken the photochromic filter. This operation may correspond to, for example, the light source 102 of FIG. 1 projecting the light 114 onto the photochromic filter 104.

At block 706, a portion of the first light is passed through the photochromic filter to an image sensor. This operation may correspond to, for example, the photochromic filter 104 of FIG. 1 projecting the light 116 onto the image sensor 118.

At block 708, the passed portion of the first light from block 706 is sensed by the image sensor. This operation may correspond to, for example, the image sensor 118 of FIG. 1 sensing the light 116 that impinges upon the image sensor 118.

At block 710, a visual representation of the area of high optical contrast is displayed based on the sensing by the image sensor. This operation may correspond to, for example, signals from an image sensor being sent to a display device (e.g., a video monitor) and the display device outputting an image based on those signals (e.g., as in FIG. 6).

The teachings herein may be implemented in a variety of ways. For example, the structure and functionality taught herein may be incorporated into various types of imaging systems (e.g., of various configurations) and into other types of apparatuses. As another example, an apparatus as taught herein may be constructed using a variety of components and materials. For example, a photochromic filter may be constructed of Transitions® photochromic material or PhotoGray material (e.g., manufactured by Corning, Inc.®).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Moreover, any reference to elements herein using a designation such as "first," "second," and so forth does not generally limit the quantity or order of those elements. Rather, these designations may be used herein as a convenient method of distinguishing between two or more different elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

While certain embodiments have been described above in detail and shown in the accompanying drawings, it is to be understood that such embodiments are merely illustrative of and not restrictive of the teachings herein. In particular, it should be recognized that the teachings herein apply to a wide variety of apparatuses and methods. It will thus be recognized that various modifications may be made to the illustrated embodiments or other embodiments, without departing from the broad scope thereof. In view of the above, it will be understood that the teachings herein are intended to cover any changes, adaptations or modifications which are within the scope of the disclosure.

What is claimed is:

1. An imaging system for sensing light in an area of high optical contrast, the imaging system comprising:
    a photochromic filter;
    at least one optical lens oriented to direct light from the area of high optical contrast to the photochromic filter;
    a photochromic activating light source oriented to project light onto the photochromic filter;
    an image sensor comprising a shutter, wherein the image sensor is oriented to receive light that passes through the photochromic filter; and
    a controller configured to synchronize the photochromic activating light source with the image sensor whereby the photochromic activating light source is turned off when the shutter is open and the image sensor is sensing.

2. The imaging system of claim 1, wherein the photochromic activating light source generates violet light or ultraviolet light.

3. The imaging system of claim 1, wherein the photochromic activating light source generates light having wavelengths in a range of 350 nanometers to 420 nanometers.

4. The imaging system of claim 1, wherein the photochromic filter is constructed to absorb light having wavelengths in a range of 400 nanometers to 650 nanometers if the photochromic filter is subjected to the light projected by the photochromic activating light source.

5. The imaging system of claim 1, wherein a central axis associated with a light path from the photochromic activating light source to the photochromic filter is oriented at an angle with respect to a central axis associated with a light path from the photochromic filter to the image sensor.

6. The imaging system of claim 5, wherein the angle is such that a majority of light projected by the photochromic activating light source does not impinge upon the image sensor.

7. The imaging system of claim 5, wherein the angle is greater than 20 degrees.

8. The imaging system of claim 1, wherein the photochromic activating light source comprises an aperture configured to restrict the light from the photochromic activating light source to thereby project an image on a surface of the photochromic filter.

9. The imaging system of claim 1, wherein the photochromic activating light source comprises a laser configured to scan a light pattern onto a surface of the photochromic filter.

10. The imaging system of claim 1, wherein the controller is further configured to:
    receive a signal corresponding to a desired opacity of the photochromic filter; and
    control intensity of the light projected by the photochromic activating light source based on the signal.

11. The imaging system of claim 10, wherein, to control the intensity, the controller is further configured to specify a duty cycle for the light projected by the photochromic activating light source.

12. The imaging system of claim 1, further comprising a filter oriented to prevent the light projected by the photochromic activating light source from impinging upon the image sensor.

13. The imaging system of claim 12, wherein the filter is configured to block light having wavelengths in a range of 350 nanometers to 420 nanometers.

14. The imaging system of claim 1, wherein the controller is further configured to deactivate the photochromic activating light source a defined period of time prior to activation of the image sensor.

15. The imaging system of claim 1, wherein the at least one optical lens comprises an objective lens assembly.

16. The imaging system of claim 1, further comprising an aperture structure adjacent the at least one optical lens and configured to restrict the light directed to the photochromic filter.

17. The imaging system of claim 1, further comprising a support structure wherein:
    the photochromic filter, the at least one optical lens, the photochromic activating light source, and the image sensor are attached to the support structure.

18. A method for viewing an area of high optical contrast, the method comprising:
    directing first light from the area of high optical contrast to a photochromic filter;
    projecting second light onto the photochromic filter to darken the photochromic filter;
    passing a portion of the first light through the photochromic filter to an image sensor comprising a shutter;
    sensing the passed portion of the first light by the image sensor;
    synchronizing the projecting of the second light onto the photochromic filter with the sensing by the image sensor whereby the second light is turned off when the shutter is open and the image sensor is sensing the passed portion of the first light; and
    displaying a visual representation of the area of high optical contrast based on the sensing by the image sensor.

19. An imaging system for sensing light in an area of high optical contrast, the imaging system comprising:
    a photochromic filtering means;
    means for directing light from the area of high optical contrast to the photochromic filtering means;
    means for projecting light onto the photochromic filtering means to darken the photochromic filtering means;

means for sensing light that passes through the photochromic filtering means, wherein the means for sensing comprises a shutter; and means for synchronizing the means for projecting with the means for sensing whereby the projecting of the light is turned off when the shutter is open and the means for sensing is sensing the light that passes through the photochromic filtering means.

\* \* \* \* \*